(12) United States Patent
Kimura

(10) Patent No.: US 10,043,253 B2
(45) Date of Patent: Aug. 7, 2018

(54) IMAGE PROCESSING DEVICE, IMAGE PROCESSING METHOD, AND PROGRAM

(71) Applicant: CANON KABUSHIKI KAISHA, Tokyo (JP)

(72) Inventor: Naoto Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 15/181,922

(22) Filed: Jun. 14, 2016

(65) Prior Publication Data
US 2016/0371823 A1 Dec. 22, 2016

(30) Foreign Application Priority Data
Jun. 16, 2015 (JP) .................. 2015-121363

(51) Int. Cl.
*G06K 9/38* (2006.01)
*G06T 5/50* (2006.01)
*G06T 5/00* (2006.01)

(52) U.S. Cl.
CPC ............ *G06T 5/50* (2013.01); *G06T 5/008* (2013.01); *G06T 2207/10144* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| 7,920,200 B2 * | 4/2011 | Azuma | ............ H04N 5/23238 348/211.8 |
| 8,472,712 B2 * | 6/2013 | Cote | ................ G06T 5/008 348/222.1 |

(Continued)

FOREIGN PATENT DOCUMENTS

| EP | 2 202 212 A2 | 6/2010 |
| EP | 2 574 727 A1 | 4/2013 |

(Continued)

OTHER PUBLICATIONS

"Category:Ceramic materials—Wikipedia," Retrieved from Internet URL: https://en.wikipedia.org/w/index.php?title=Category:Ceramic_ materials&oldid=675299258, on Jul. 14, 2017, pp. 1-5 (Aug. 9, 2015).

(Continued)

*Primary Examiner* — Andrae S Allison
(74) *Attorney, Agent, or Firm* — Canon U.S.A., Inc. IP Division

(57) ABSTRACT

An image processing device includes an input unit, a generation unit, a gain processing unit, a development processing unit, and a composition unit. The input unit receives input of a plurality of images having different exposures from one another. The generation unit generates gain information according to each of the plurality of images input through the input unit. The gain processing unit applies gain processing to each of the plurality of images based on the gain information generated by the generation unit. The development processing unit applies development processing to each of the plurality of images to which the gain processing has been applied by the gain processing unit. The composition unit composites the plurality of images to which the development processing has been applied by the development processing unit.

12 Claims, 16 Drawing Sheets

(56) References Cited

U.S. PATENT DOCUMENTS

| | | | |
|---|---|---|---|
| 8,768,066 B2 * | 7/2014 | Wu | H04N 9/3129 348/208.1 |
| 2005/0264684 A1 * | 12/2005 | Kamon | H04N 5/2351 348/362 |
| 2006/0140503 A1 * | 6/2006 | Kurata | H04N 5/3572 382/275 |
| 2006/0256207 A1 * | 11/2006 | Kokubo | H04N 5/2351 348/223.1 |
| 2006/0274170 A1 * | 12/2006 | Azuma | H04N 5/23238 348/246 |
| 2009/0284618 A1 * | 11/2009 | Kurahashi | H04N 5/235 348/229.1 |
| 2010/0194932 A1 * | 8/2010 | Mitsuya | H04N 5/217 348/241 |
| 2011/0176033 A1 * | 7/2011 | Liu | G03B 7/28 348/239 |
| 2013/0235257 A1 * | 9/2013 | Kaida | H04N 5/2351 348/362 |
| 2013/0286246 A1 * | 10/2013 | Matsuoka | G06T 5/007 348/229.1 |
| 2014/0079333 A1 * | 3/2014 | Hirai | H04N 5/23235 382/255 |
| 2015/0109525 A1 * | 4/2015 | Kimura | H04N 5/20 348/370 |

FOREIGN PATENT DOCUMENTS

| | | |
|---|---|---|
| EP | 3 124 753 A1 | 2/2017 |
| JP | 2010-98616 A | 4/2010 |
| JP | 2012-29029 A | 2/2012 |
| WO | 2009/126191 A2 | 10/2009 |
| WO | 2014/165073 A1 | 10/2014 |

OTHER PUBLICATIONS

"Ceramic matrix composite—Wikipedia," Retrieved from Internet URL: https://en.wikipedia.org/w/index.php?title=Ceramic_matrix_composite&oldid=722547687, on Jul. 14, 2017, pp. 1-11 (May 28, 2016).

"Coefficient of Thermal expansion for various materials at Different temperatures contents," Technical Report, Balseal Engineering, Retrieved from Internet URL: http://www.balseal.com/sites/default/files/tr18_020707131421.pdf, on Jul. 17, 2017, pp. 1-6 (Jun. 25, 2004).

International Search Report and Written Opinion issued in connection with corresponding PCT Application No. PCT/US2017/029041 dated Aug. 7, 2017.

* cited by examiner

CAPTURED IMAGES

BEFORE DISTORTION
ABERRATION CORRECTION

AFTER DISTORTION
ABERRATION CORRECTION

AFTER PROJECTIVE
TRANSFORMATION

CORRESPONDING TO POSITIONS OF
SECOND SHOOTING IN FIG. 16C

CORRESPONDING TO POSITIONS OF
FIRST SHOOTING IN FIG. 16C

IMAGE PROCESSING DEVICE, IMAGE PROCESSING METHOD, AND PROGRAM

BACKGROUND OF THE INVENTION

Field of the Invention

The present invention relates particularly to an image processing device, an image processing method, and a program favorably used to generate an image with an enlarged dynamic range.

Description of the Related Art

A high dynamic range (HDR) technique has been known in the past in which positions in multiple images having different exposures from one another are aligned and then the images are composited, thereby realizing an image with an enlarged dynamic range. In the HDR technique, however, in order to composite the images having different exposures from one another, it is required to carry out the composition such that tone jump that can be generated by frames with different brightness is not noticeable. Taking this into account, the conventional technique has composited images in such a manner that tones of the images having different exposures from one another are compressed using tone curves while the brightness is adjusted. As a result, an image with the enlarged dynamic range has been generated in which the tone jump is not noticeable with ease. However, the tone compression and the brightness adjustment using the tone curves have caused a problem of reduced contrast.

For a solution to this problem, for example, methods described in Japanese Patent Application Laid-Open No. 2012-29029 and Japanese Patent Application Laid-Open No. 2010-98616 disclose a technique for generating an HDR image with high contrast in which the images having different exposures from one another are composited and then a gain characteristic is determined based on an image of a luminance distribution after the composition to carry out tone processing.

In the conventional technique disclosed in Japanese Patent Application Laid-Open No. 2012-29029 and Japanese Patent Application Laid-Open No. 2010-98616 described above, however, the tone processing is applied again to the image after the composition through the gain processing, resulting in a problem of an increased noise amount. It is considered in this situation that noise reduction processing is applied after the composition to suppress the increase in the noise amount. However, the images are deformed during the position alignment among the multiple images, bringing a problem of degradation in band occurring within a frame in accordance with a deformation amount. This accordingly causes difficulties in applying the optimal noise reduction processing and optimal edge enhancement processing to the image composited after the position alignment.

Taking the above-described problem in consideration, an object of the invention is to make it possible to generate an HDR image with high contrast and a favorable image quality.

SUMMARY OF THE INVENTION

An image processing device according to an aspect of the invention includes an input unit configured to receive input of a plurality of images having different exposures from one another, a generation unit configured to generate gain information according to each of the plurality of images input through the input unit, a gain processing unit configured to apply gain processing to each of the plurality of images based on the gain information generated by the generation unit, a development processing unit configured to apply development processing to each of the plurality of images to which the gain processing has been applied by the gain processing unit, and a composition unit configured to composite the plurality of images to which the development processing has been applied by the development processing unit.

Further features of the present invention will become apparent from the following description of exemplary embodiments (with reference to the attached drawings).

DESCRIPTION OF THE EMBODIMENTS

Figure 14:
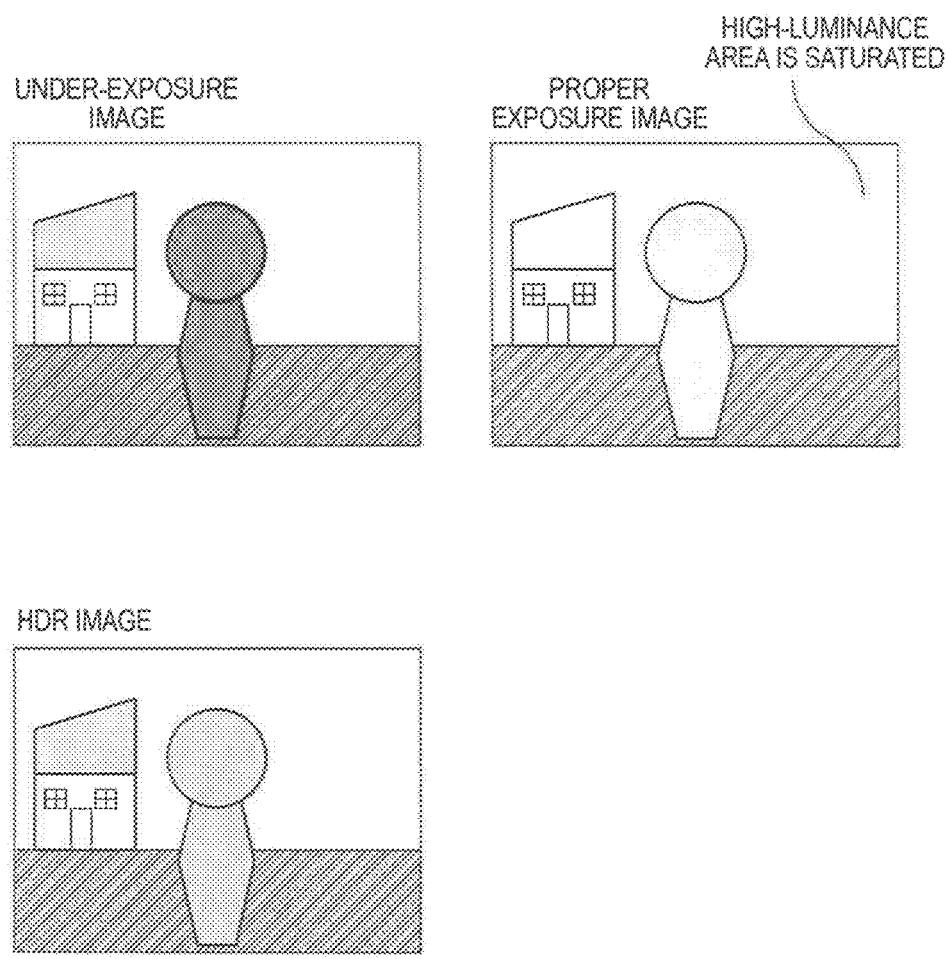
FIG. 14 is a diagram for explaining an example where an HDR image is generated from two images having different exposures from each other.

Hereinafter, a favorable exemplary embodiment according to the invention will be described in detail with reference to the accompanying drawings. As illustrated in FIG. 14, the exemplary embodiment will describe processing for generating an HDR image with an enlarged dynamic range using two images, namely, a proper exposure image captured with a proper exposure and an under-exposure image captured with an under exposure compared to the proper exposure. First, a gain map is generated for an under-exposure image to apply gain processing to the under-exposure image and thereafter, development processing is applied thereto. Next, as for a proper exposure image, the gain map for the under-exposure image is used to be converted to a gain map for the proper exposure image. The gain processing is then applied to the proper exposure image using that gain map and thereafter, the development processing also is applied thereto. Subsequently, positions are aligned between the under-exposure image and the proper exposure image after the development processing and a composition ratio is obtained from the gain map for the under-exposure image. Thereafter, the two images are composited based on that composition ratio and as a result, an HDR image is obtained.

Figure 1:
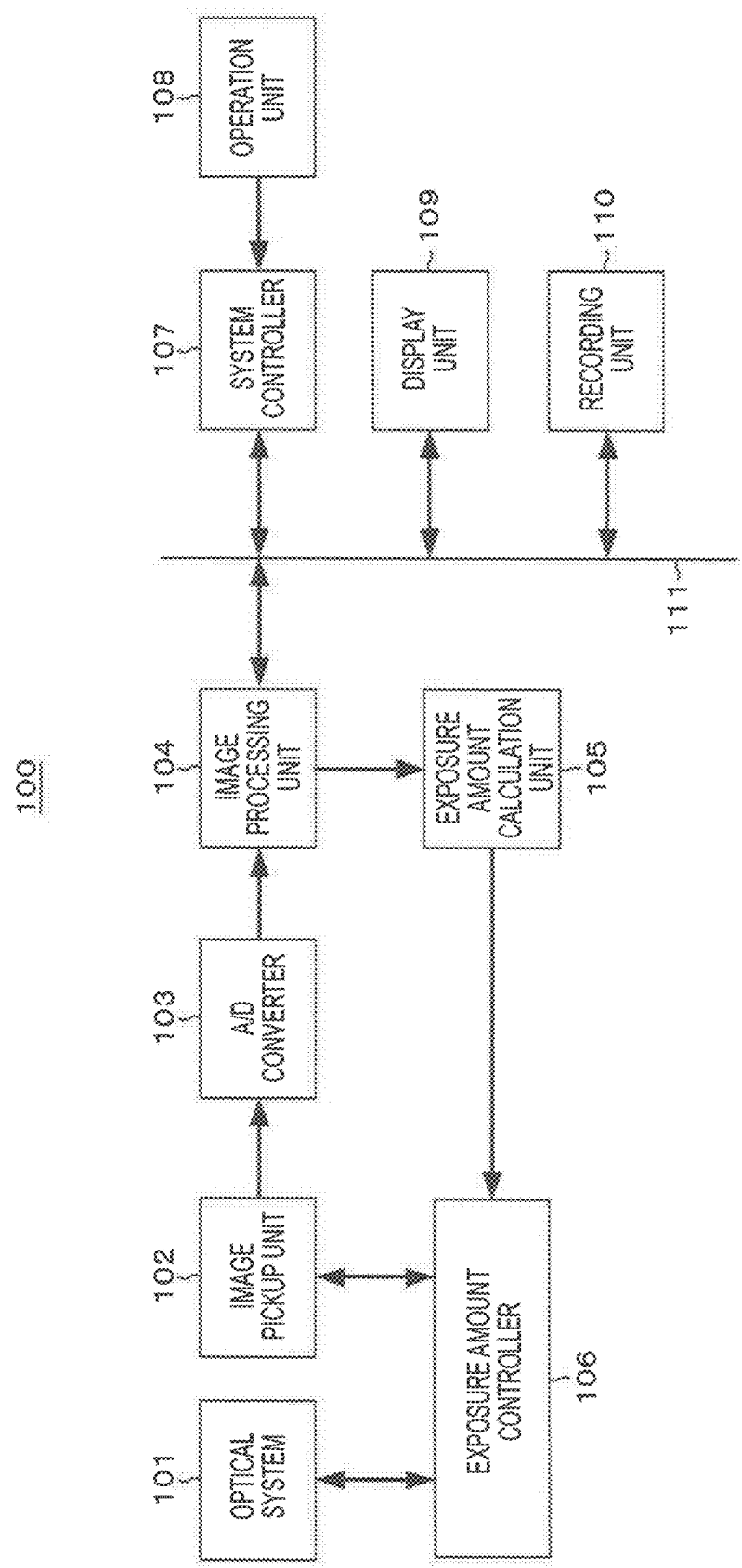
FIG. 1 is a block diagram illustrating an exemplary configuration of an image processing device according to an exemplary embodiment.

FIG. 1 is a block diagram illustrating an exemplary configuration of an image processing device 100 according to the exemplary embodiment.

An optical system 101 in FIG. 1 includes a lens group constituted by a zoom lens, a focus lens, and the like, an aperture adjustment device, and a shutter device. This optical system 101 adjusts magnification, an in-focus position, or light intensity of an object image that reaches an image pickup unit 102. The image pickup unit 102 is a photoelectric conversion element such as a CCD sensor or a CMOS sensor that photoelectrically converts, to an electrical signal, luminous flux of the object that has passed the optical system 101. An analog-to-digital (A/D) converter 103 converts an input image signal to digital image data.

An image processing unit 104 carries out HDR composition processing according to the exemplary embodiment as well as usual signal processing. Details of the HDR composition processing will be described later. In addition to the image processing for the image data output from the A/D converter 103, the image processing unit 104 is also capable of applying similar image processing to image data read from a recording unit 110. A detailed configuration of the image processing unit 104 will be described later.

An exposure amount calculation unit 105 is a member that calculates an exposure amount at the time of capturing an image to obtain an optimal input image through tone processing. While calculating the exposure amount, the exposure amount calculation unit 105 receives input of a result of the processing by the image processing unit 104 and then calculates the exposure amount to output to an exposure amount controller 106. In order to realize the exposure amount calculated by the exposure amount calculation unit 105, the exposure amount controller 106 controls the optical system 101 and the image pickup unit 102 to control an aperture, a shutter speed, and an analog gain of a sensor.

A system controller 107 is a control function unit including a CPU, a ROM, and a RAM to control and supervise the functioning of the entire image processing device 100 according to the exemplary embodiment. In addition, based on a luminance value obtained from the image data processed in the image processing unit 104, an instruction input through an operation unit 108, and the like, the system controller 107 controls driving of the optical system and the image pickup unit 102. Furthermore, the control of the system controller 107 includes display control for displaying an image or the like on a display unit 109 and control for compressing the processed image data to record to the recording unit 110.

The display unit 109 is constituted by a liquid crystal display, an organic electro luminescence (EL) display, or the like to display an image according to the image data generated at the image pickup unit 102, the image data read from the recording unit 110, and the like. The recording unit 110 having a function for recording the image data may include an information recording medium using a package containing, for example, a memory card equipped with a semiconductor memory or a rotary recording body such as a magneto-optical disk, and additionally, this information recording medium may be configured to be detachable. A bus 111 is used to mutually transfer data among the image processing unit 104, the system controller 107, the display unit 109, and the recording unit 110.

Next, the processing within the image processing unit 104 will be described in detail. The HDR composition processing carried out by the image processing unit 104 according to the exemplary embodiment is divided into three phases, namely, processing for the captured under-exposure image, processing for the captured proper exposure image, and processing for generating an HDR image from these two images.

First, among the processing in the image processing unit 104, a phase relating to the processing for the captured under-exposure image will be described.

Figure 2:
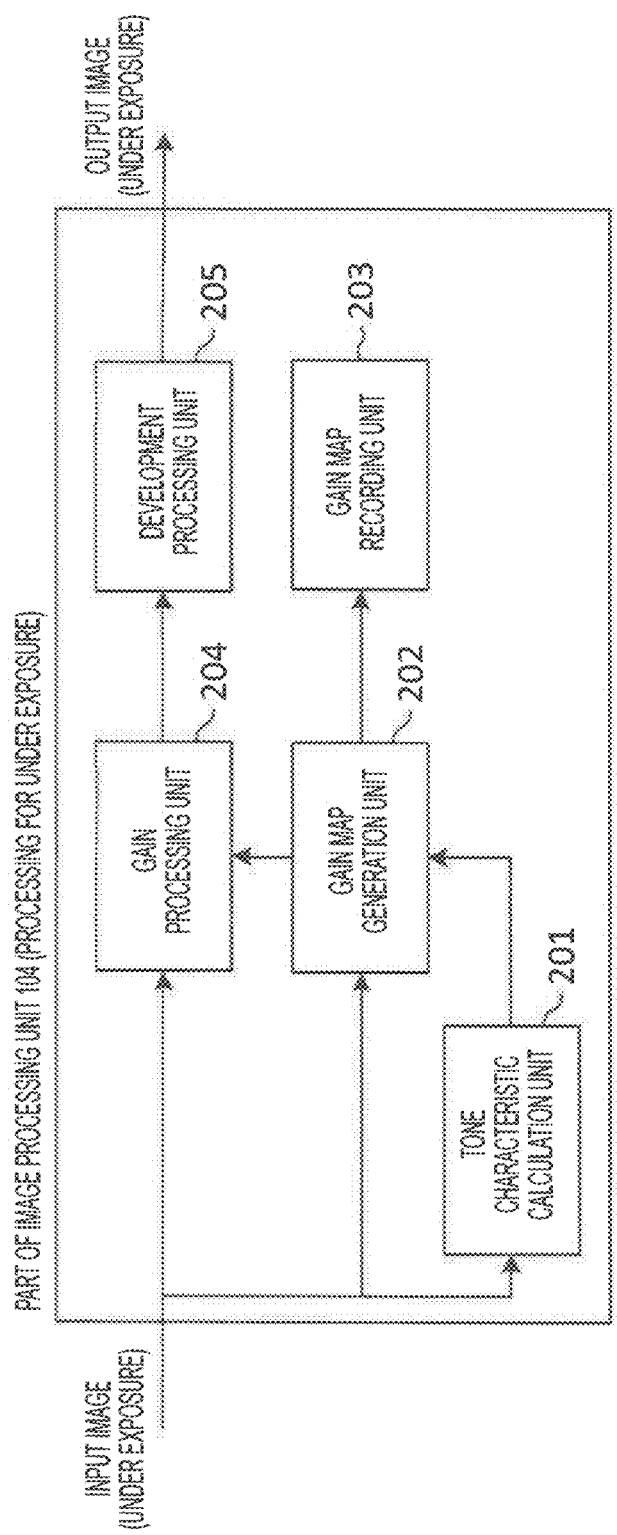
FIG. 2 is a block diagram illustrating an exemplary functional configuration for processing an under-exposure image within an image processing unit.

FIG. 2 is a block diagram illustrating an exemplary functional configuration for processing the under-exposure image within the image processing unit 104. An outline of the processing is as follows: a gain map is generated for the captured under-exposure image as gain information and then gain processing is carried out using the gain map; thereafter, development processing is carried out, thereby generating an output image with an under exposure.

As illustrate in FIG. 2, a tone characteristic calculation unit 201, a gain map generation unit 202, a gain map recording unit 203, a gain processing unit 204, and a development processing unit 205 are provided as configurations for processing the captured under-exposure image. Hereinafter, processing carried out by these respective configurations will be described with reference to a flowchart in FIG. 7.

Figure 7:
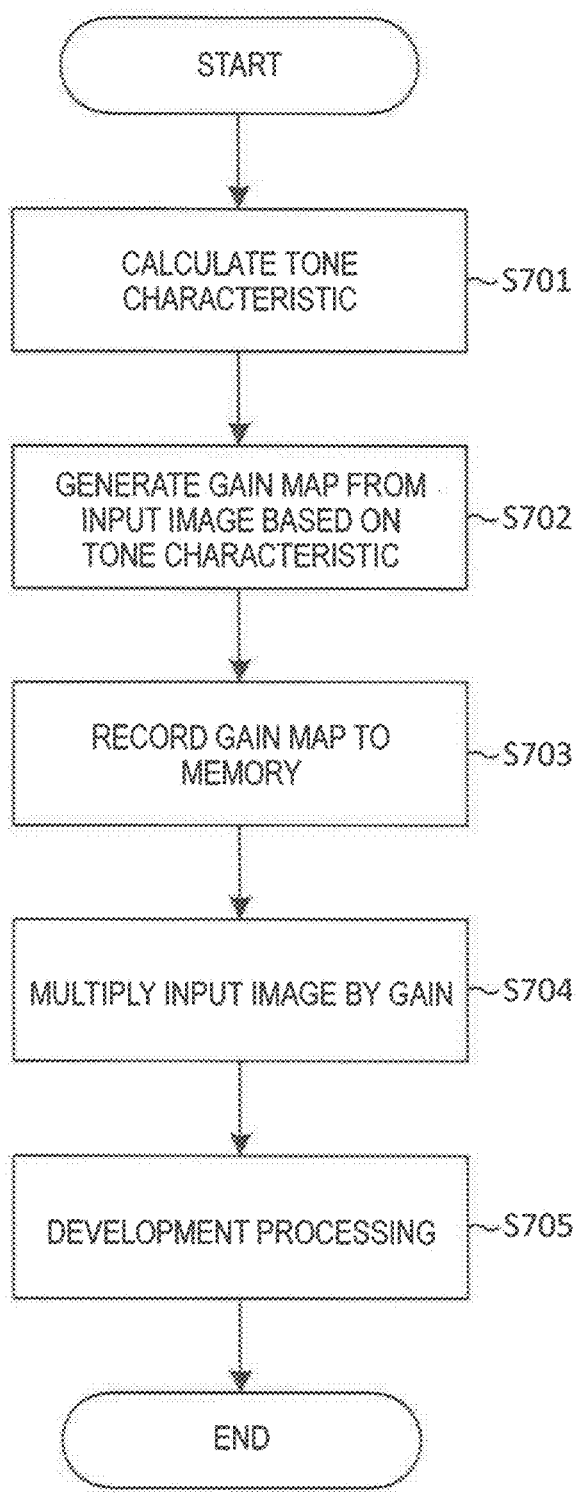
FIG. 7 is a flowchart illustrating an example of an image processing procedure for the under-exposure image.
Figure 13A:
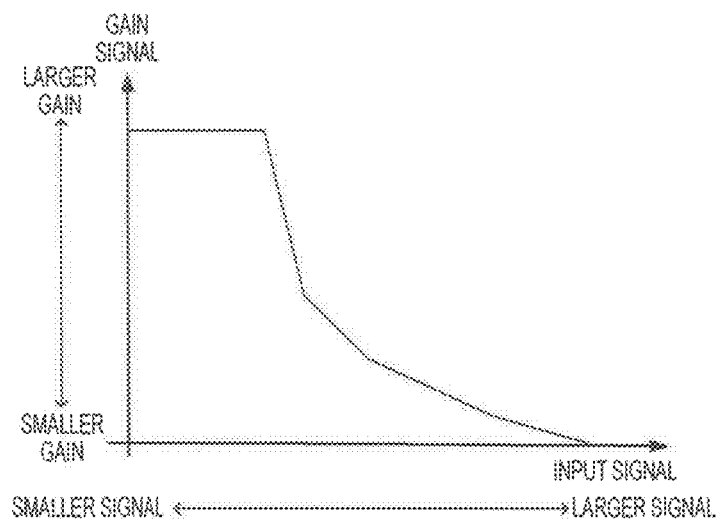
FIGS. 13A and 13B are diagrams for explaining a gain table and gains at respective coordinates.

FIG. 7 is a flowchart illustrating an example of an image processing procedure for the under-exposure image. First, the processing is started when the under-exposure image obtained from the image pickup unit 102 is input to the image processing unit 104. In step S701, the tone characteristic calculation unit 201 calculates a tone characteristic which is information required for generating the gain map. As illustrated in FIG. 13A, the tone characteristic according to the exemplary embodiment assumed as a gain table where a horizontal axis represents an input signal, whereas a vertical axis represents a gain signal. A method for calculating the gain table is not particularly limited and, for example, a known technique that uses object information for the calculation may be employed, or alternatively, a predetermined tone characteristic may be read as the gain table as it is.

Figure 13B:
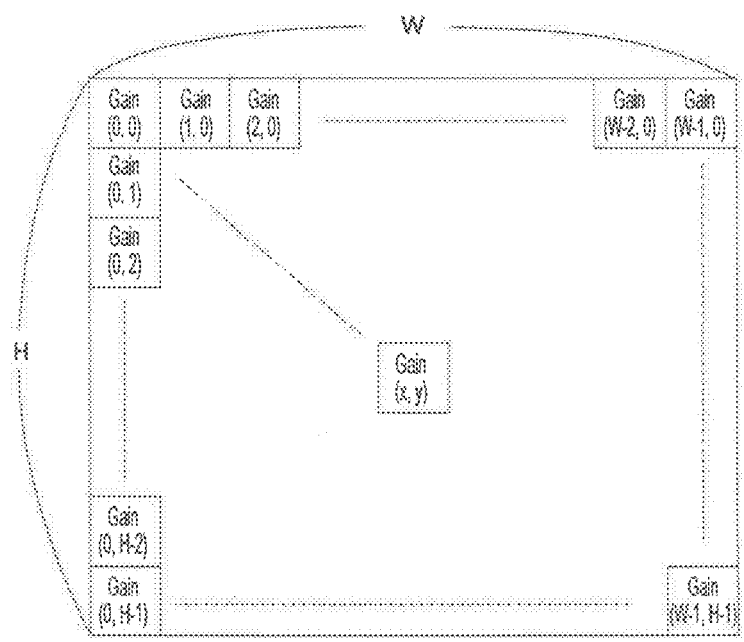

Subsequently in step S702, the gain map generation unit 202 uses the tone characteristic calculated in step S701 and the input under-exposure image to generate the gain map. Here, as illustrated in FIG. 13B, the gain map depicts gains Gain (x,y) corresponding to coordinates (x,y) for an area equivalent to an image size. In FIG. 13B, W represents the number of horizontal pixels in an image, whereas H represents the number of vertical pixels in the image. As a method for generating the gain map, processing that uses images having different resolutions or a generation method that uses images with different frequency bands such as Retinex processing is employed. The exemplary embodiment has generated, as the gain information, the gain map obtained by mapping relationships between the respective coordinates and the respective gains within an image. However, mapping is not necessarily required as long as the gain information expresses the relationships between the respective coordinates and the respective gains within an image.

Subsequently in step S703, the gain map generation unit 202 records the gain map generated in step S702 to the gain map recording unit 203. The recorded gain map is to be used later in the processing for the proper exposure image and the processing for generating the HDR image.

Subsequently in step S704, based on the gain map generated in step S702, the gain processing unit 204 applies the gain processing to the input under-exposure image. When the input signal of the under-exposure image at coordinates (x,y) before the gain processing is assumed as in (x,y), whereas a gain value from the gain map is assumed as Gain (x,y), an output signal out (x,y) of the under-exposure image after the gain processing is calculated using the following formula (1).

[Math. 1]

$$\text{out}(x,y) = \text{in}(x,y) \times \text{Gain}(x,y) \quad (1)$$

Subsequently in step S705, the development processing unit 205 applies the development processing to the image to which the gain processing has been applied in step S704, including noise reduction processing, edge enhancement processing, and gamma processing. During this development processing, parameters for the noise reduction processing and the edge enhancement processing may be changed depending on the tone characteristic calculated in step S701 and the gain map generated in step S702.

Next, among the processing in the image processing unit 104, a phase relating to the processing for the captured proper exposure image will be described.

Figure 3:
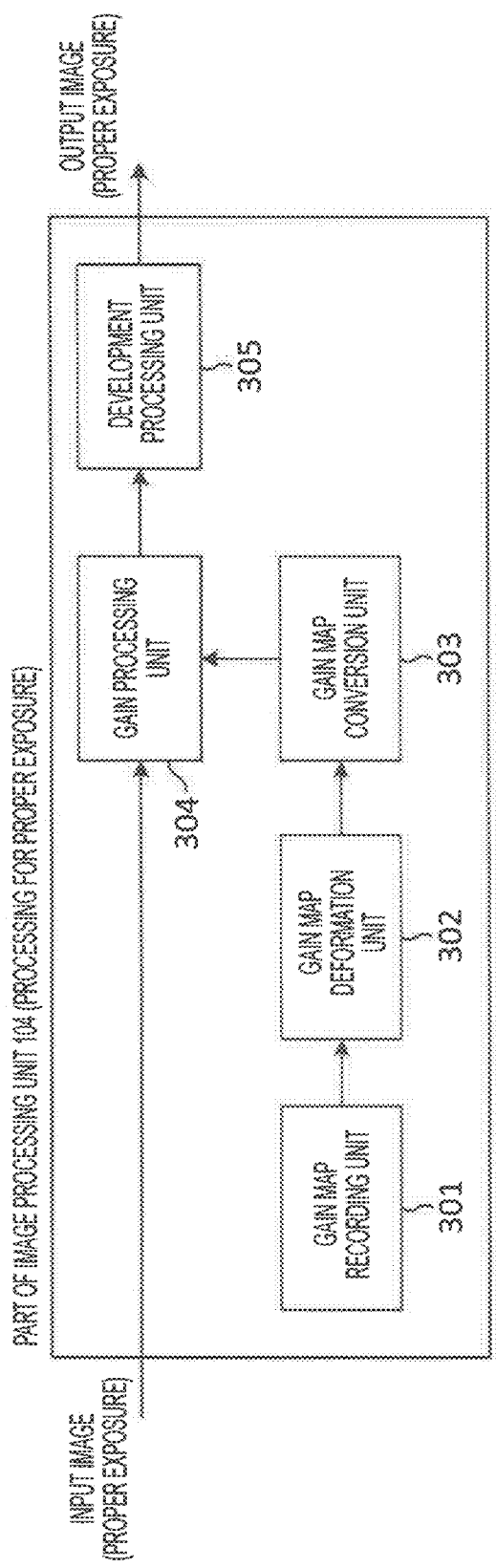
FIG. 3 is a block diagram illustrating an exemplary functional configuration for processing a proper exposure image within the image processing unit.

FIG. 3 is a block diagram illustrating an exemplary functional configuration for processing the proper exposure image within the image processing unit 104. In an outline of this processing, a major difference from the processing for the under-exposure image is found in that the gain map is not newly generated but the gain map generated during the processing for the under-exposure image is read to be deformed and converted and then this gain map is applied to the gain processing.

As illustrated in FIG. 3, a gain map recording unit 301, a gain map deformation unit 302, a gain map conversion unit 303, a gain processing unit 304, and a development processing unit 305 are provided as configurations for processing the captured proper exposure image. The gain map recording unit 301 has a configuration similar to that of the gain map recording unit 203 in FIG. 2. Hereinafter, processing carried out by these respective configurations will be described with reference to a flowchart in FIG. 8.

Figure 8:
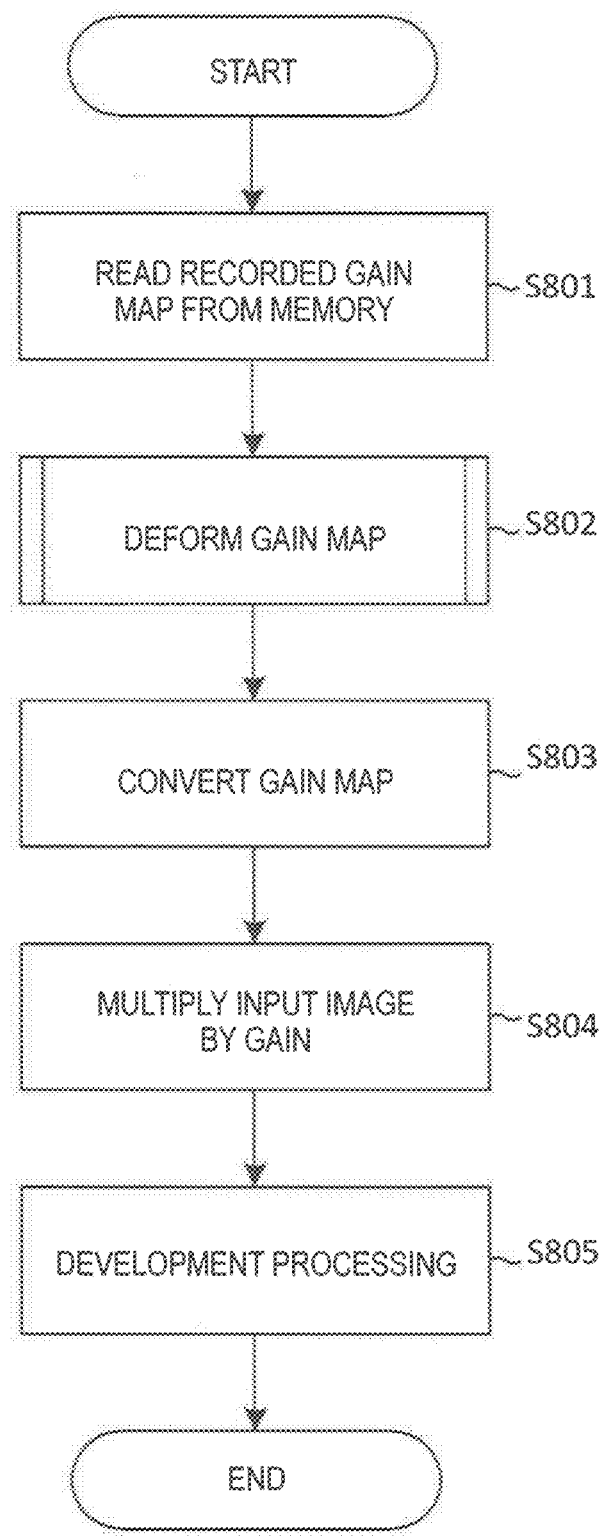
FIG. 8 is a flowchart illustrating an example of an image processing procedure for the proper exposure image.

FIG. 8 is a flowchart illustrating an example of an image processing procedure for the proper exposure image.

First, the processing is started when the proper exposure image obtained from the image pickup unit 102 is input to the image processing unit 104. In step S801, the gain map deformation unit 302 reads the gain map generated based on the under-exposure image from the gain map recording unit 301.

Subsequently in step S802, because the gain map read in step S801 corresponds to positions in the under exposure image, the gain map deformation unit 302 carries out processing for deforming the gain map to make the gain map correspond to positions in the proper exposure image. Here, the positions in the proper exposure image stand for coordinates on an image and, when shooting times differ between the under-exposure image and the proper exposure image, the positions are shifted due to the influence of hand shake and the like. For this reason, the processing for making the positions correspond to the proper exposure image is required. Details of the processing by the gain map deformation unit 302 corresponding to step S802 will be described later.

Subsequently in step S803, the gain map conversion unit 303 carries out processing for converting the gain value of the gain map, which has been deformed in step S802 such that the gain map corresponds to the positions in the proper exposure image, from the gain value for the under-exposure image to the gain value for the proper exposure image. Here, a value of the gain map at coordinates (x,y) after the deformation is assumed as Gain_in (x,y), whereas a value of the gain map at the coordinates (x,y) after the conversion is assumed as Gain_out (x,y). Additionally, when an exposure difference in the proper exposure relative to the under-exposure image is assumed as Δev, the gain map is converted using the following formula (2).

[Math. 2]

$$\text{Gain\_out}(x,y) = \text{Gain\_in}(x,y) \times 2^{-\Delta ev} \quad (2)$$

Subsequently in step S804, based on the gain map converted in step S803, the gain processing unit 304 applies the gain processing to the proper exposure image. The content of the gain processing is similar to that in step S704 described above and thus the detailed description thereof will be omitted.

Subsequently in step S805, the development processing unit 305 applies the development processing to the image to which the gain processing has been applied in step S804, including the noise reduction processing, the edge enhancement processing, and the gamma processing. The content of the development processing is similar to that in step S705 described above and thus the detailed description thereof will be omitted.

Next, the detailed content of the processing by the gain map deformation unit 302 in step S802 will be described. As described above, the gain map deformation unit 302 carries out the processing for deforming the gain map such that the gain map corresponding to the positions in the under-exposure image corresponds to the positions in the proper exposure image.

Figure 15:
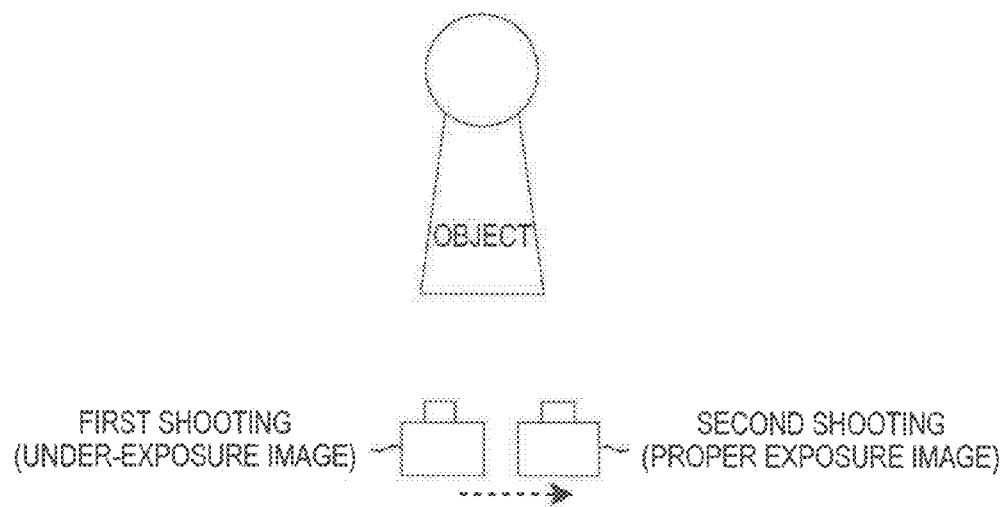
FIG. 15 is a diagram illustrating an example where two images of an object are captured.
Figure 16A:
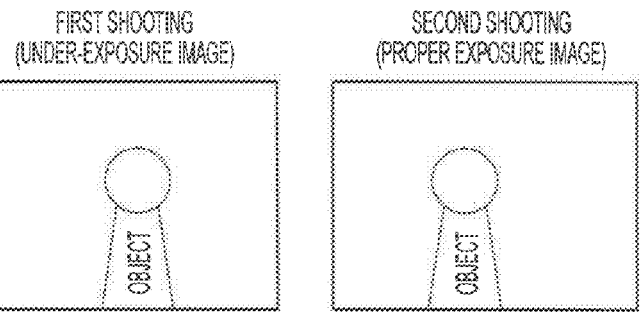
FIGS. 16A to 16D are diagrams for explaining distortion aberration correction and projective transformation.

FIG. 15 is a diagram illustrating an example where two images of an object are captured. FIG. 16A is a diagram illustrating two captured images where first shooting captures the under-exposure image whereas second shooting captures the proper exposure image.

Figure 16B:
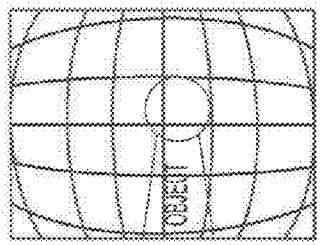
Figure 16B:
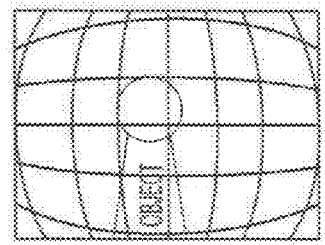
Figure 16C:
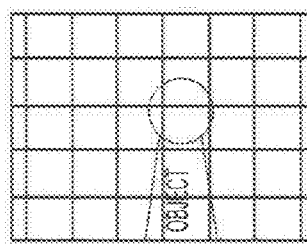
Figure 16C:
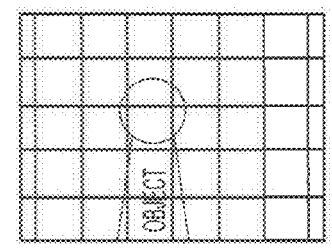
Figure 16D:
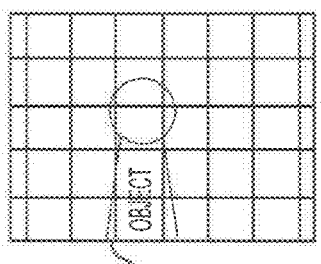
Figure 16D:
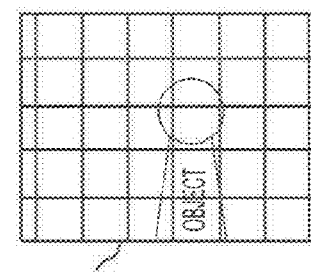

Each of the captured images illustrated in FIG. 16A contains distortion aberration of a lens at the time of being captured as illustrated in FIG. 16B. Accordingly, in order to align positions between the under-exposure image obtained through the first shooting and the proper exposure image obtained through the second shooting, it is necessary to correct the distortion aberration as illustrated in FIG. 16C and thereafter, deform the images using projective transformation as illustrated in FIG. 16D.

Meanwhile, as will be described later in detail, because the distortion aberration correction for the under-exposure image and the proper exposure image according to the exemplary embodiment is carried out after the gain processing and the development processing, the image containing the distortion aberration is used at the time of the gain processing. Accordingly, in order to deform the gain map to make the gain map correspond to the positions in the proper exposure image, the distortion aberration corresponding to the positions in the under-exposure image needs to be corrected before the projective transformation is carried out and additionally, the distortion aberration corresponding to the positions in the proper exposure image needs to be added. The reason why the distortion aberration correction and the projective transformation are carried out after the development processing is that the noise reduction processing and the edge enhancement processing cannot be favorably carried out when variations in band occur due to the image deformation.

Figure 5:
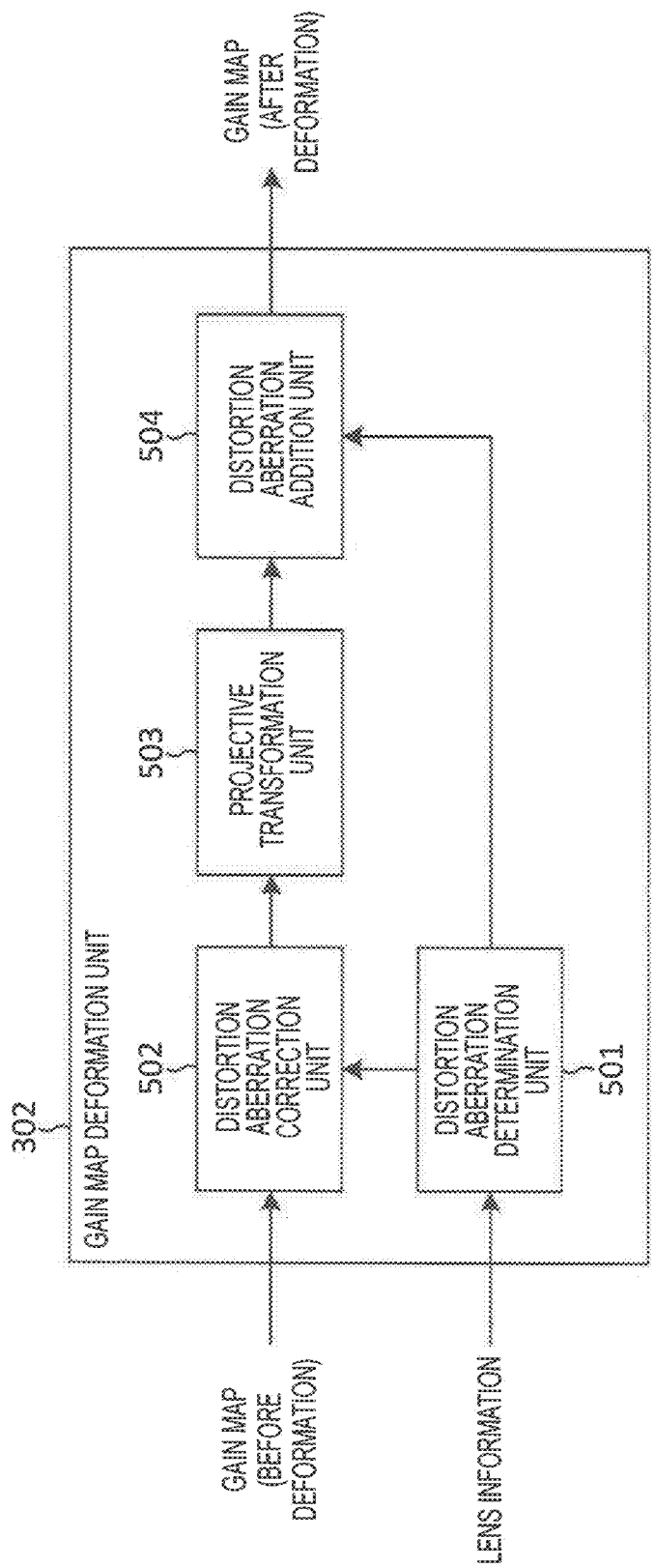
FIG. 5 is a block diagram illustrating an exemplary detailed configuration of a gain map deformation unit.

FIG. 5 is a block diagram illustrating an exemplary detailed configuration of the gain map deformation unit 302.

As illustrated in FIG. 5, the gain map deformation unit 302 includes a distortion aberration determination unit 501, a distortion aberration correction unit 502, a projective transformation unit 503, and a distortion aberration addition unit 504. Hereinafter, the processing by the gain map deformation unit 302 will be described with reference to a flowchart in FIG. 10.

Figure 10:
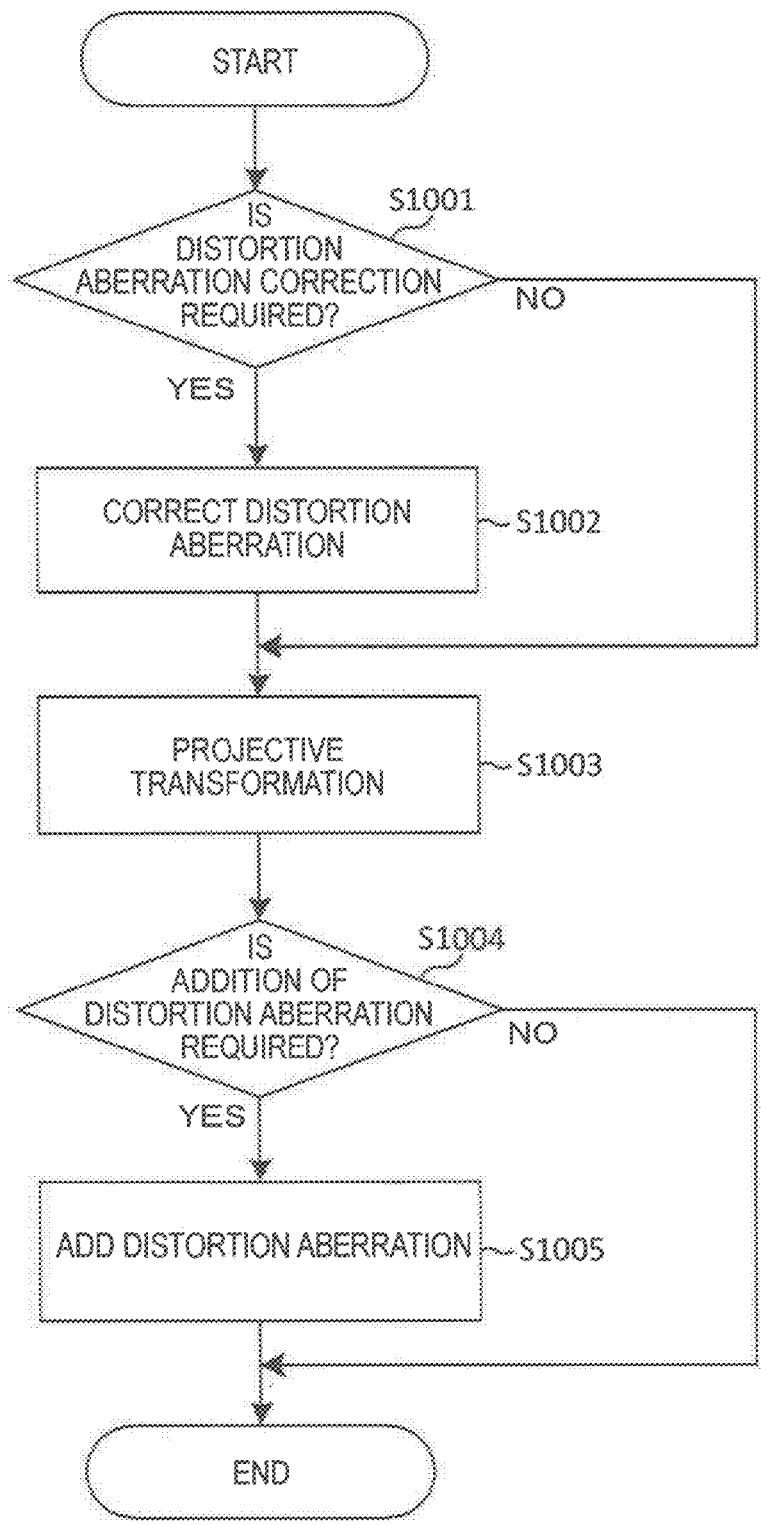
FIG. 10 is a flowchart illustrating an example of a detailed processing procedure for the gain map deformation unit.

FIG. 10 is a flowchart illustrating an example of a detailed processing procedure for the gain map deformation unit 302 in step S802.

First, in step S1001, the distortion aberration determination unit 501 receives input of lens information and the like to determine whether the distortion aberration correction is required. As a result of this determination, when the distortion aberration correction is required, the processing proceeds to step S1002; on the other hand, when the distortion aberration correction is not required, the processing proceeds to step S1003.

In step S1002, the distortion aberration correction unit 502 applies distortion aberration correction processing to the input gain map. A known method is used as a method for correcting the distortion aberration such as correction by shifting coordinates based on a table of a correction amount from coordinates of an optical center in accordance with an image height. At this time, the coordinates of the optical center are assumed to represent coordinates of an optical center when the under-exposure image is captured.

Subsequently in step S1003, the projective transformation unit 503 carries out the projective transformation of the gain map whose distortion aberration has been corrected in step S1002 or an input gain map to align the gain map to the positions in the proper exposure image. A typical formula such as the following formula (3) is used for the projective transformation. Here, projective transformation coefficients $a_0$ to $a_7$ are assumed to be calculated using, for example, a least-squares method using a detection result of a motion vector or gyro sensor information. A method for aligning the positions is not limited to the projective transformation and, for example, affine transformation or trapezoid transformation may be used.

[Math. 3]

$$x' = \frac{a_0 x + a_1 y + a_2}{a_6 x + a_7 y + 1}$$

$$y' = \frac{a_3 x + a_4 y + a_5}{a_6 x + a_7 y + 1}$$

(3)

Subsequently in step S1004, the distortion aberration addition unit 504 receives input of the lens information and the like to determine whether addition of the distortion aberration is required. As a result of this determination, when the addition of the distortion aberration is required, the processing proceeds to step S1005; on the other hand, when the addition of the distortion aberration is not required, the processing by the gain map deformation unit 302 is terminated. In this determination, whether the addition of the distortion aberration is required is determined based on whether the distortion aberration correction has been determined to be required in step S1001.

In step S1005, the distortion aberration addition unit 504 adds the distortion aberration to the gain map aligned to the positions in the proper exposure image in step S1003 to align the gain map to the positions in the proper exposure image before the distortion aberration correction. A method such as one that converts the coordinates after the distortion aberration correction to the coordinates before the distortion aberration correction based on a table of a correction amount from coordinates of an optical center in accordance with an image height is used as a method for adding the distortion aberration. The coordinates of the optical center when the distortion aberration is added are assumed to represent coordinates of an optical center when the proper exposure image is captured.

With the processing carried out as described above, the gain map can be deformed such that the gain map corresponding to the positions in the underexposure image corresponds to the positions in the proper exposure image.

Next, among the processing in the image processing unit 104, a phase relating to the processing for generating an HDR image from the under-exposure image and the proper exposure image after the development processing will be described.

Figure 4:
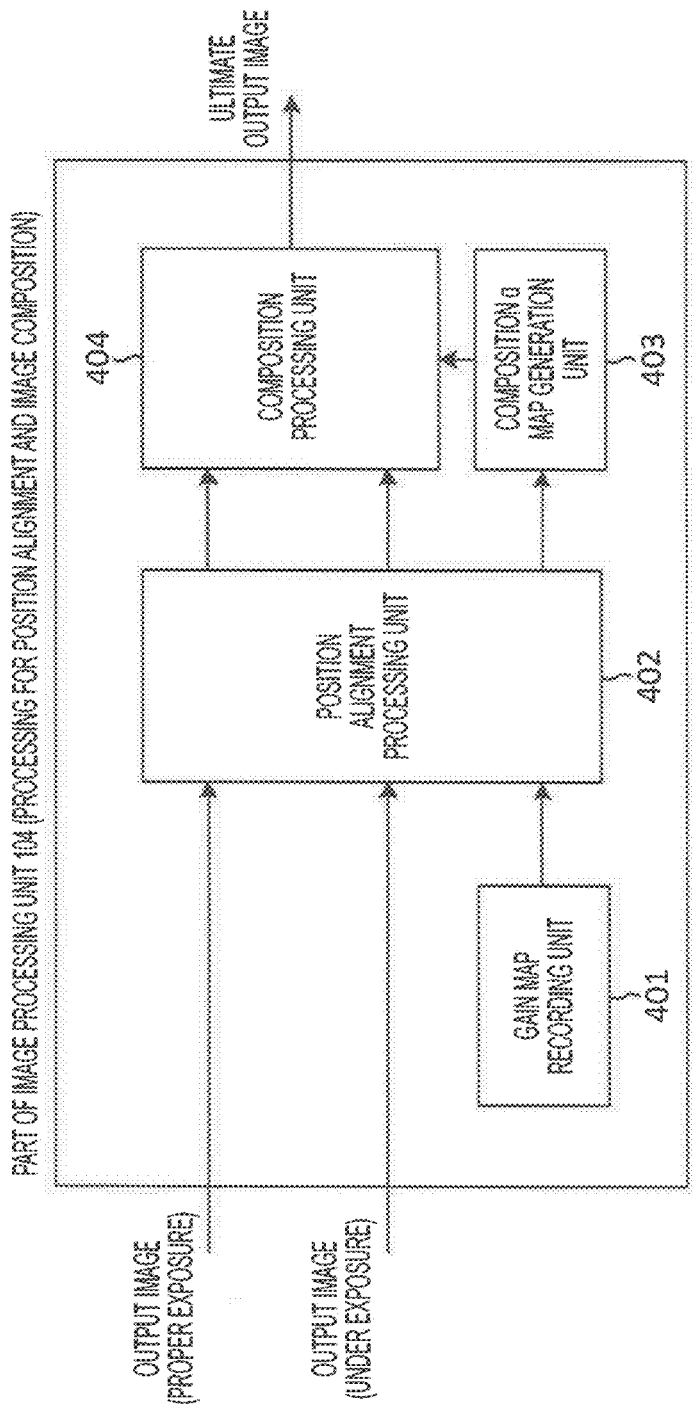
FIG. 4 is a block diagram illustrating an exemplary functional configuration for generating an HDR image within the image processing unit.

FIG. 4 is a block diagram illustrating an exemplary functional configuration for generating the HDR image within the image processing unit 104. An outline of the processing is as follows: the positions are aligned between the under-exposure image and the proper exposure image after the development processing, while a map called an α map representing a composition ratio is generated based on the recorded gain map; thereafter, the under-exposure image and the proper exposure image for which the position alignment has been completed are composited in accordance with the α map, thereby generating the HDR image as ultimate output.

As illustrated in FIG. 4, a gain map recording unit 401, a position alignment processing unit 402, a composition α map generation unit 403, and a composition processing unit 404 are provided as configurations for carrying out the processing for generating the HDR image. The gain map recording unit 401 has a configuration similar to that of the gain map recording unit 203 in FIG. 2. Hereinafter, processing carried out by these respective configurations will be described with reference to a flowchart in FIG. 9.

Figure 9:
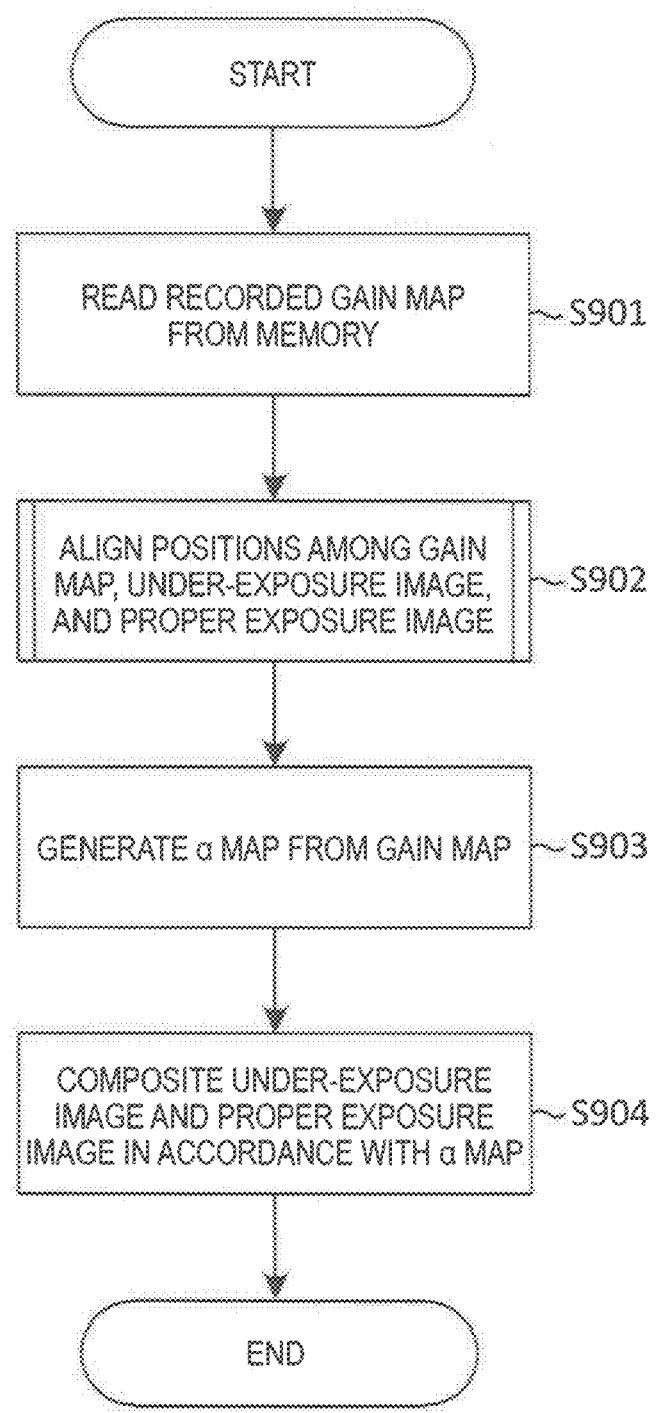
FIG. 9 is a flowchart illustrating an example of a processing procedure for generating the HDR image.

FIG. 9 is a flowchart illustrating an example of a processing procedure for generating the HDR image.

First, the processing is started when the under-exposure image and the proper exposure image after the development processing are input to the image processing unit 104. In step S901, the position alignment processing unit 402 reads the gain map generated based on the under-exposure image from the gain map recording unit 401.

Subsequently in step S902, the position alignment processing unit 402 aligns positions among the input under-exposure image, the input proper exposure image, and the gain map. This processing will be described later in detail.

Subsequently in step S903, based on the gain may for which the position alignment has been completed in step S902, the composition α map generation unit 403 generates the α map representing the composition ratio between the under-exposure image and the proper exposure image. Here, a relationship in the composition ratio between the underexposure image and the proper exposure image will be described with reference to FIG. 12.

Figure 12:
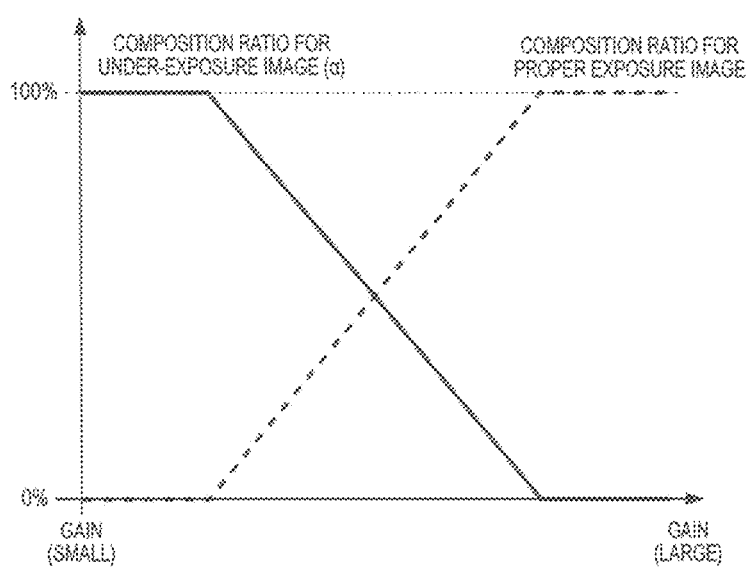
FIG. 12 is a diagram illustrating an example of a composition α map.

In FIG. 12, a vertical axis represents the composition ratio, whereas a horizontal axis represents the gain. The gain represented by the horizontal axis is a gain by which the under-exposure image is multiplied, that is, a value from the gain map. As the gain in the under-exposure image becomes larger, a noise affects the image quality to a greater extent. Therefore, a larger composition ratio is employed for the proper exposure image. In contrast to this, as the gain in the under-exposure image becomes smaller, the proper exposure image has a stronger possibility of being saturated. Therefore, a larger composition ratio is employed for the under-exposure image. In the exemplary embodiment, the composition ratio for the under-exposure image whose value is assumed as $\alpha$ is converted to a value of $\alpha$ depending on the value of the gain map, whereby the composition $\alpha$ map such as the one illustrated in FIG. 12 is generated.

In step S904, based on the composition $\alpha$ map generated in step S903, the composition processing unit 404 composites the under-exposure image and the proper exposure image for which the position alignment has been completed in step S902 to generate the HDR image as ultimate output. In this processing, a pixel value of the under-exposure image at coordinates (x,y) is assumed as pix_u(x,y), whereas a pixel value of the proper exposure image at coordinates (x,y) is assumed as pix_t(x,y). In addition, a value of the $\alpha$ map at coordinates (x,y) is assumed as $\alpha(x,y)$. In this case, a pixel value pix_hdr(x,y) of the HDR image after the composition can be calculated using the following formula (4), where $0 \leq \alpha(x,y) \leq 1$ is assumed.

[Math. 4]

$$\text{pix\_hdr}(x,y) = \alpha(x,y) \times \text{pix\_u}(x,y) + (1-\alpha(x,y)) \times \text{pix\_t}(x,y) \quad (4)$$

With the processing carried out as described above, the HDR image can be generated from the under-exposure image and the proper exposure image after the development processing.

Next, the detailed content of the processing by the position alignment processing unit 402 in step S902 will be described. In this processing, the position alignment processing unit 402 carries out processing for aligning the input under-exposure image, the input proper exposure image, and the gain map to the positions in the under-exposure image.

Figure 6:
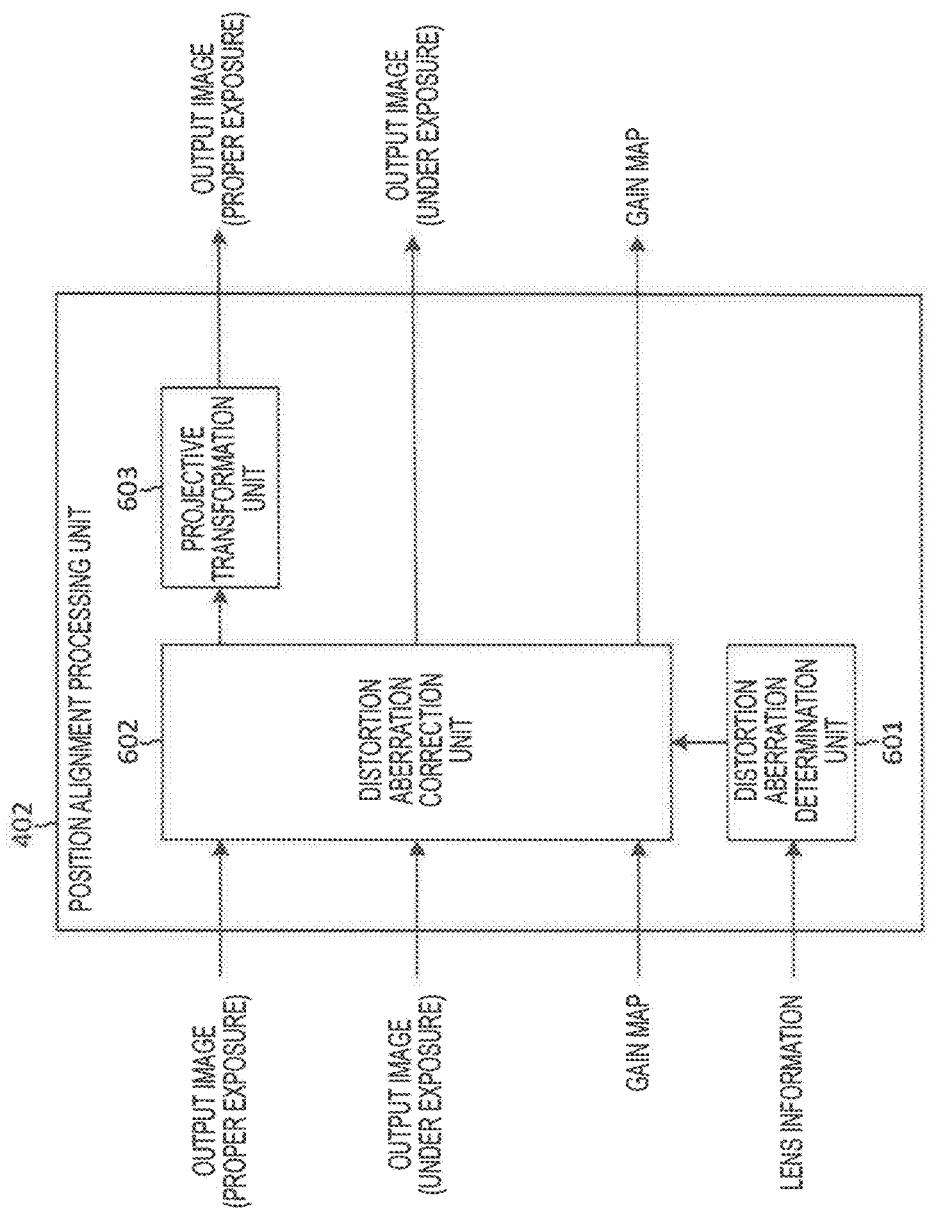
FIG. 6 is a block diagram illustrating an exemplary detailed configuration of a position alignment processing unit.

FIG. 6 is a block diagram illustrating an exemplary detailed configuration of the position alignment processing unit 402.

As illustrated in FIG. 6, the position alignment processing unit 402 includes distortion aberration determination unit 601, a distortion aberration correction unit 602, and a projective transformation unit 603. Hereinafter, the processing by the position alignment processing unit 402 will be described with reference to a flowchart in FIG. 11.

Figure 11:
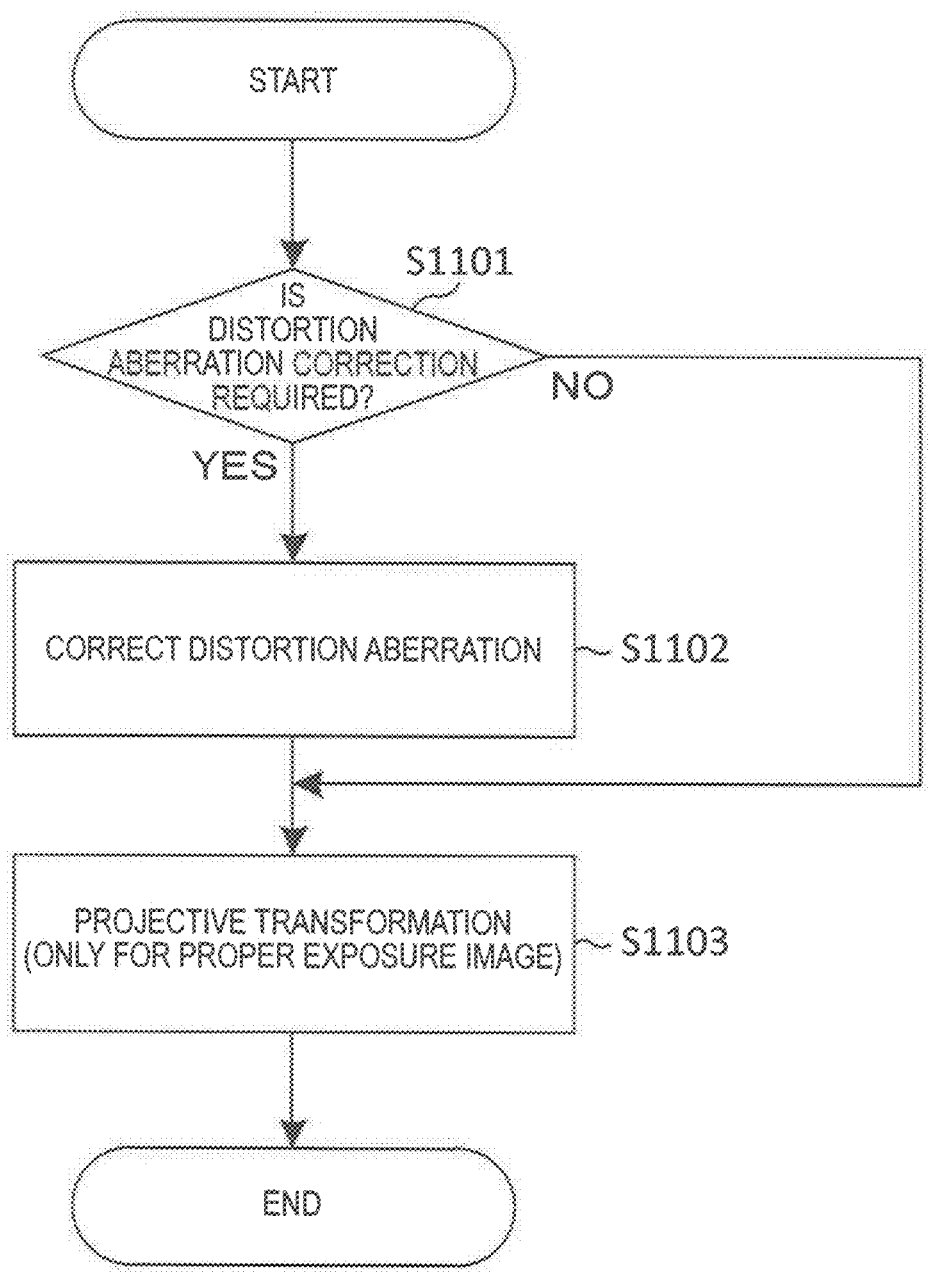
FIG. 11 is a flowchart illustrating an example of a detailed processing procedure for the position alignment processing unit.

FIG. 11 is a flowchart illustrating an example of a detailed processing procedure for the position alignment processing unit 402 in step S902.

First, in step S1101, the distortion aberration determination unit 601 receives input of the lens information and the like to determine whether the distortion aberration correction is required. As a result, of this determination, when the distortion aberration correction is required, the processing proceeds to step S1102; on the other hand, when the distortion aberration correction is not required, the processing proceeds to step S1103.

Subsequently in step S1102, the distortion aberration correction unit 602 applies the distortion aberration correction to the input under-exposure image, the input proper exposure image, and the gain map. A method for correcting the distortion aberration is similar to that in step S1002 described above and thus the description thereof will be omitted.

Subsequently in step S1103, the projective transformation unit 603 carries out the projective transformation of the proper exposure image to align the proper exposure image to the positions in the under-exposure image. A method for the projective transformation is similar to that in step S1003 described above and thus the description thereof will be omitted. A method for aligning the positions is not limited to the projective transformation and, for example, affine transformation or trapezoid transformation may be used. Using the procedure as described above, the positions can be aligned among the input under-exposure image, the input proper exposure image, and the gain map.

As described thus far, according to the exemplary embodiment, the gain processing is carried out before deforming images to composite and thus the development processing can be carried out without the generation of bands due to the deformation or the composition. As a result, a high quality HDR image with high contrast can be generated. The exemplary embodiment has described an example where the HDR image is generated through the composition of one under-exposure image and one proper exposure image. However, an over-exposure image may be additionally composited to generate the HDR image. This case can be realized by applying processing similar to that for the proper exposure image to the over-exposure image.

Other Exemplary Embodiments

The favorable exemplary embodiment according to the invention has been described. However, the invention. is not limited to the exemplary embodiment and various variations and modifications can be made within the scope of the sprit thereof. The invention can be also realized through processing that supplies, to a system or a device through a network or a storage medium, a program that realizes one or more functions of the above-described exemplary embodiment and then causes one or more processors in a computer of the system or the device to read the program to execute. Alternatively, the invention can be realized by a circuit (e.g., ASIC) that realizes one or more functions thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121363, filed Jun. 16, 2015, which is hereby incorporated by reference herein in its entirety.

What is claimed is:

1. An image processing device comprising:
one or more processors; and
memory storing instructions that, when executed by the one or more processors, cause the image processing apparatus to perform operations including:
receiving input of a plurality of images having different exposures from one another,
generating gain information indicating relationships between coordinates and gains within each of the input plurality of images,
wherein generating the gain information includes generating, using a specific image, gain information indicating a relationship between coordinates and a gain of one image of the plurality of images having an exposure that is the smallest among exposure of the plurality of images, wherein the specific image is an image having a frequency band or resolution different from that of the image having the smallest exposure, and includes generating gain information indicating relationships between coordinates and gains of the rest of the plurality of images based on the generated gain information, applying gain processing to each of the plurality of images based on the generated gain information, applying development processing to each of the plurality of images to which the gain processing has been applied, and compositing the plurality of images to which the development processing has been applied by applying the development processing.

2. The image processing device according to claim 1, wherein the one or more processors executing the instructions further cause the image processing apparatus to perform operations including aligning positions among the plurality of images to which the development processing has been applied, and wherein compositing includes compositing the plurality of images for which the position alignment has been completed.

3. The image processing device according to claim 2, wherein aligning includes correcting distortion aberration in the plurality of images to which the development processing has been applied and, thereafter, aligns positions among the plurality of images.

4. The image processing device according to claim 3, wherein aligning includes determining whether to correct the distortion aberration in the plurality of images based on lens information and, when determining to correct the distortion aberration, corrects the distortion aberration in the plurality of images.

5. The image processing device according to claim 1, wherein, when generating the gain information according to the rest of the plurality of images, generating includes generating the gain information in which positions are adjusted among the plurality of images.

6. The image processing device according to claim 5, wherein, when generating the gain information according to the rest of the plurality of images, generating includes correcting distortion aberration in the gain information indicating a relationship between coordinates and a gain of the image having the smallest exposure among the plurality of images, then carries out projective transformation of that gain information, and thereafter adds distortion aberration of the rest of the plurality of images to that gain information, to generate the gain information in which positions are adjusted among the plurality of images.

7. The image processing device according to claim 6, wherein generating includes determining whether to correct the distortion aberration in the gain information based on lens information and, when determining to correct the distortion aberration, corrects the distortion aberration in the gain information according to the one image.

8. The image processing device according to claim 1, wherein the one image is an image having a minimum exposure.

9. The image processing device according to claim 1, wherein compositing includes calculating a composition ratio for the plurality of images based on the gain information according to one image among the plurality of images and carries out the composition based on the calculated composition ratio.

10. The image processing device according to claim 1, wherein the development processing includes noise reduction processing and edge enhancement processing.

11. An image processing method for an image processing device, the image processing method comprising:

receiving input of a plurality of images having different exposures from one another;

generating gain information indicating relationships between coordinates and gains within each of the input plurality of images;

wherein generating the gain information includes generating, using a specific image, gain information indicating a relationship between coordinates and a gain of one image of the plurality of images having an exposure that is the smallest among exposure of the plurality of images, wherein the specific image is an image having a frequency band or resolution different from that of the image having the smallest exposure, and includes generating gain information indicating relationships between coordinates and gains of the rest of the plurality of images based on the generated gain information;

applying gain processing to each of the plurality of images based on the generated gain information;

applying development processing to each of the plurality of images to which the gain processing has been applied; and compositing the plurality of images to which the development processing has been applied by applying the development processing.

12. A non-transitory computer readable storage medium storing a program that causes a computer to perform an image processing method for an image processing device, the image processing method comprising:

receiving input of a plurality of images having different exposures from one another;

generating gain information indicating relationships between coordinates and gains within each of the input plurality of images;

wherein generating the gain information includes generating, using a specific image, gain information indicating a relationship between coordinates and a gain of one image of the plurality of images having an exposure that is the smallest among exposure of the plurality of images, wherein the specific image is an image having a frequency band or resolution different from that of the image having the smallest exposure, and includes generating gain information indicating relationships between coordinates and gains of the rest of the plurality of images based on the generated gain information;

applying gain processing to each of the plurality of images based on the generated gain information;

applying development processing to each of the plurality of images to which the gain processing has been applied; and compositing the plurality of images to which the development processing has been applied by applying the development processing.

* * * * *